3,166,399
CONTROLLING UNDESIRABLE PLANT GROWTH WITH UNSYMMETRICALLY SUBSTITUTED s-TETRAZINES
Albert W. Lutz, Princeton, and Bryant L. Walworth, Pennington, N.J., assignors to American Cyanamid Company, Stamford, Conn., a corporation of Maine
No Drawing. Filed Dec. 3, 1962, Ser. No. 241,501
6 Claims. (Cl. 71—2.5)

The present invention relates to herbicidal compositions. More particularly, it relates to herbicidal compositions containing as an active ingredient an unsymmetrically disubstituted s-tetrazine represented by the formula:

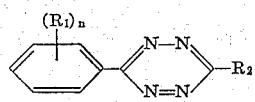

wherein $R_1$ represents a radical such as hydrogen, lower alkyl, a halogen such as fluorine, bromine, chlorine or iodine, hydroxy, lower alkoxy, lower alkylthio, amino, mono(lower alkyl)amino, di(lower alkyl)amino, carboxyl or carbalkoxy; $n$ is an integer from 1 to 3; and $R_2$ stands for hydrogen, a halogen, such as fluorine, bromine, chlorine or iodine, lower alkylthio, or the nitrogen containing substituent:

wherein $R_3$ and $R_4$ may be the same or different and each represents hydrogen, lower alkyl, aryl, lower alkenyl, hydroxy-substituted lower alkyl, carboxy-substituted lower alkyl radicals, and when joined, $R_3$ and $R_4$ together form a 3- to 6-membered heterocyclic moiety.

Illustrative unsymmetrical 3,6-disubstituted s-tetrazine compounds, which can be employed in the invention are:

3-bromo-6-phenyl-s-tetrazine,
3-bromo-6-p-chlorophenyl-s-tetrazine,
3-bromo-6-p-tolyl-s-tetrazine,
3-bromo-6-p-cumenyl-s-tetrazine,
3-amino-6-phenyl-s-tetrazine,
3-methylthio-6-phenyl-s-tetrazine,
3-amino-6-(m-chlorophenyl)-s-tetrazine,
3-amino-6-(p-chlorophenyl)-s-tetrazine,
3-amino-6-p-tolyl-s-tetrazine,
3-methylamino-6-phenyl-s-tetrazine,
3-dimethylamino-6-phenyl-s-tetrazine,
3-(m-chlorophenyl)-6-dimethylamino-s-tetrazine,
3-(p-chlorophenyl)-6-dimethylamino-s-tetrazine,
3-(2,4-dichlorophenyl)-6-dimethylamino-s-tetrazine,
3-dimethylamino-6-p-tolyl-s-tetrazine,
3-(p-chlorophenyl)-6-diethylamino-s-tetrazine,
2,2'-[6-(p-chlorophenyl)-s-tetrazin-3-ylimino]-diethanol,
3-(diallylamino)-6-(p-chlorophenyl)-s-tetrazine,
3-aziridinyl-6-(p-chlorophenyl)-s-tetrazine,
3-morpholino-6-(isopropylphenyl)-s-tetrazine,
3-bromo-6-(p-hydroxyphenyl)-s-tetrazine,
3-amino-6-(p-methoxyphenyl)-s-tetrazine,
3-dimethylamino-6-(m-ethylthiophenyl)-s-tetrazine,
3-(m-carbethoxyphenyl)-6-dimethylamino-s-tetrazine,
3-(p-dimethylaminophenyl)-6-ethylamino-s-tetrazine,
3-anilino-6-phenyl-s-tetrazine, and
3-piperidinyl-6-p-tolyl-s-tetrazine.

The unsymmetrical 3,6-disubstituted s-tetrazines employed in the compositions of the present invention can be prepared according to any desired procedure known in the art as illustrated for instance in the Journal of the American Chemical Society, vol. 80, 3155 (1958).

In general, the herbicidal compositions of the present invention are prepared by admixing the active compound with an inert carrier material of the type referred to in the art as pest control adjuvants in solid or liquid form. Typical carriers include: the talcs, clays, pumice, silica, diatomaceous earth, walnut flour, chalk and equivalents of the same.

Liquid compositions may be prepared by dissolving the active compound in water or by dissolving it initially in common organic solvents and then admixing the solutions with water, either with or without an emulsifying agent. The disubstituted s-tetrazines are quite soluble in common organic solvents, such as acetone, methyl isobutyl ketone, dioxane, isopropyl acetate, ethanol, xylene, dimethyl sulfoxide or dimethyl formamide.

Surface active agents, or emulsifiers, which can be herein employed, are those normally used in the preparation of oil-in-water emulsions. Illustrative of the latter are ionic and non-ionic dispersing or emulsifying agents, such as the higher alkylaryl sulfonates, sodium lignin sulfonate, polyglycol ethers or sodium dioctyl sulfosuccinate. Advantageously, the emulsifying agents are employed in low concentrations, usually in the range of from about 0.1% to about 2% by weight of the total weight of the concentration.

The compounds of the present invention may be applied either as a spray, as a dust or as a wettable powder to the locus to be protected from undesirable plant growth. The amount of disubstituted s-tetrazine compound in the herbicidal composition will vary in the manner and purpose for which the composition is to be so-employed. Concentrations for subsequent use in preparing spray formulations may contain as much as 90% or more by weight of the active ingredient. Sprays or dusts for direct use will be relatively dilute, in some instances as low as 0.5%, or less.

The invention will be further illustrated by the following examples. These are not to be taken as limitative of the invention. Unless otherwise noted, all parts are by weight.

EXAMPLE 1

(A) The herbicidal activity of illustrative active s-tetrazine compounds, when employed in a post emergence test, is demonstrated as follows:

Johnsongrass, quackgrass, field bindweed, Canada thistle, southern nutgrass, millet, wheat, radish and tomato plants growing in small containers in the greenhouse are sprayed to the point of run-off with the herbicide solution containing 1,000 parts per million of the active s-tetrazine ingredient in 50% acetone/water mixture containing 0.1% sodium dioctyl sulfosuccinate by weight based on the overall mixture. This treatment is equivalent to approximately 12.5 pounds or herbicide active ingredient per acre. The treated plants are placed in a greenhouse and the effects are recorded three weeks later.

(B) A high degree of pre-emergence activity of the s-tetrazine compounds is similarly demonstrated as follows:

Seeds of ryegrass, millet, mustard and of wheat and radish are thoroughly mixed in potting soil. Approximately one inch of each of the seed soil mixtures is planted on top of one inch of potting soil in separate round pint cups. 25 milliliters of the herbicide solution containing 1000 parts per million active ingredient in 50% acetone/water containing 0.1% sodium dioctyl sulfosuccinate are applied on the soil surface in each cup previously wet by 25 milliliters of tap water. The treatment is equal to 25 pounds of herbicide active ingredient per acre. The cups are placed in the greenhouse, and the results are recorded three weeks later.

The results obtained with the active, unsymmetrically substituted s-tetrazine applied post-emergence and pre-emergence are presented in Table I below.

Table I

| Compound | Herbitoxicity Index [1] | |
|---|---|---|
| | Post-emergence | Pre-emergence |
| 3-bromo-6-phenyl-s-tetrazine | B | D |
| 3-bromo-6-p-chlorophenyl-s-tetrazine | C | D |
| 3-bromo-6-p-tolyl-s-tetrazine | C[2] | E |
| 3-bromo-6-p-cumenyl-s-tetrazine | A | E |
| 3-amino-6-phenyl-s-tetrazine | C[2] | A |
| 3-amino-6-(m-chlorophenyl)-s-tetrazine | A | A |
| 3-amino-6-(p-chlorophenyl)-s-tetrazine | B[2] | C |
| 3-amino-6-p-tolyl-s-tetrazine | C[2] | A |
| 3-methylamino-6-phenyl-s-tetrazine | AA | A |
| 3-dimethylamino-6-phenyl-s-tetrazine | AA | C |
| 3-(m-chlorophenyl)-6-dimethylamino-s-tetrazine | AA | A |
| 3-(p-chlorophenyl)-6-dimethylamino-s-tetrazine | AA | A |
| 3-(2,4-dichlorophenyl)-6-dimethylamino-s-tetrazine. | AA | C |
| 3-dimethylamino-6-p-tolyl-s-tetrazine | AA | B[2] |
| 3-(p-chlorophenyl)-6-diethylamino-s-tetrazine | AA | (2) |
| 2,2'-[6-(p-chloropheny)-s-tetrazin-3-ylimino]diethanol. | C[2] | B |
| 3-(diallylamino)-6-(p-chlorophenyl)-s-tetrazine | AA | D |
| 3-morpholino-6-(p-isopropylphenyl)-s-tetrazine | C | C |
| 6-p-cumenyl-3-dimethylamino-s-tetrazine | AA | |

[1] Herbitoxicity Index:
Post-Emergence: AA=kill at less than 1.0 lb./A.; A=kill at 1.0 lb./A.; B=kill at 5.0 lbs./A.; C=kill at 12.5 lbs./A.; D=injury but not any kill at 12.5 lbs./A.
Pre-Emergence: AA, A and B are as defined above; C=kill at 25.0 lbs./A.; D=injury but not any kill at 25.0 lbs./A.; E=no effect at 25.0 lbs./A.
[2] Minimum effective rates were not determined.

EXAMPLE 2

To illustrate the broad spectrum post-emergence activity, an illustrative s-tetrazine, namely, 3-(p-chlorophenyl)-6-dimethylamino-s-tetrazine, is applied to a variety of plants according to the procedure set forth in Example 1(A), above. The concentrations of the composition applied are varied from about 0.04 to about 5.0 pounds per acre in order to establish the minimum rate required to kill various types of plants. The results are presented in Table II, below.

Table II

| Test Plant | Minimum Rate for Kill, lbs./A. | Test Plant | Minimum Rate for Kill, lbs./A. |
|---|---|---|---|
| Alfalfa | 1.0 | Sunflower | 1.0 |
| Bluegrass, Merion | 5.0 | Red Clover | 0.25 |
| Wheat | 0.8 | Sweet Clover | 0.25 |
| Millet | 0.2 | Oats | 0.5 |
| Corn | 5.0 | Flax | 4.0 |
| Onion | 0.2 | Wild Oats | 0.2 |
| Spinach | 1.0 | Crabgrass | 0.2 |
| Beets, table | 0.2 | Barnyard-grass | 0.2 |
| Beets, sugar | 1.0 | Pigweed | 0.2 |
| Radish | 0.1 | Purslane | 0.04 |
| Trefoil, birdfoot | 5.0 | Chickweed, common | 0.2 |
| Peas, garden | 0.8 | Chickweed, mouse-ear | 0.5 |
| Soybean | 0.2 | Mustard | 0.04 |
| Carrot | 5.0 | Indian Mallow | 0.2 |
| Cotton | 0.2 | Field Bindweed | 0.2 |
| Okra | 0.2 | Canada Thistle | 0.5 |
| Tomato | 0.04 | Lambsquarters | 0.2 |

To further demonstrate post-emergence herbicidal activity at various concentrations, the following examples are presented:

EXAMPLE 3

Following the procedure set forth in Example 1(A), above, 3-(p-chlorophenyl)-6-dimethylamino-s-tetrazine is applied to purslane, mustard, radish, wild oats, tomato, Canada thistle, chickweed and pigweed at rates approximating 1.0, 0.2 and 0.04 pound per acre for post-emergence activity. The results obtained are reported in Column 1 of Table III below. These results clearly establish the high degree of post-emergence activity exhibited by the above mentioned compound at rates as low as 0.2 pound per acre, and in certain instances at rates amounting to only 0.04 pound per acre.

EXAMPLE 4

Following the procedure set forth in Example 2, 3-(p-chlorophenyl)-6-diethylamino-s-tetrazine is tested. Essentially the same results are obtained in this test as are obtained in Example 3. These results are recorded in Column 2 of Table III, below.

EXAMPLE 5

Employing the procedure of Example 2, 3-dimethylamino-6-phenyl-s-tetrazine is tested. Results obtained are essentially the same as those obtained with the compounds of Examples 3 and 4. The results are recorded in Column 3 of Table III.

EXAMPLE 6

Employing the procedure of Example 2, 3-dimethylamino-6-p-tolyl-s-tetrazine is tested. The results obtained are recorded in Column 4 of Table III.

Table III

POST-EMERGENCE ACTIVITY [1]

| Test Species | Compound (1) (Col. 1) | Compound (2) (Col. 2) | Compound (3) (Col. 3) | Compound (4) (Col. 4) |
|---|---|---|---|---|
| 1.0 lb./A.: | | | | |
| Purslane | 5 | 5 | 5 | 5 |
| Mustard | 5 | 5 | 5 | 5 |
| Radish | 5 | 5 | 5 | |
| Wild Oats | 5 | 5 | 5 | 4+ |
| Tomato | 5 | 5 | 5 | |
| Canada Thistle | 5 | 1 | 5 | 2 |
| Chickweed | 5 | 5- | 5 | |
| Pigweed | 5 | 5 | 5 | 5 |
| 0.2 lb./A.: | | | | |
| Purslane | 5 | 5 | 5 | 5 |
| Mustard | 5 | 5 | 4 | 5 |
| Radish | 5 | 5 | 4 | |
| Wild Oats | 2 | 2 | 1 | 1 |
| Tomato | 5 | 5 | 5 | |
| Canada Thistle | 2 | 1 | 2 | 1 |
| Chickweed | 5 | 2 | 4+ | |
| Pigweed | 5 | 5 | 5 | 5 |
| 0.04 lb./A.: | | | | |
| Purslane | 5 | 5 | 5 | |
| Mustard | 5 | 2 | 0+ | |
| Radish | 2 | 2 | 2 | |
| Wild Oats | 0 | 0 | 0 | |
| Tomato | 5 | 0 | 0 | |
| Canada Thistle | 0+ | 0 | 0+ | |
| Chickweed | 1 | 0 | 1 | |
| Pigweed | 3+ | 3+ | 1 | |

Compound (1): 3-(p-chlorophenyl)-6-dimethylamino-s-tetrazine.
Compound (2): 3-(p-chlorophenyl)-6-diethylamino-s-tetrazine.
Compound (3): 3-dimethylamino-6-phenyl-s-tetrazine.
Compound (4): 3-dimethylamino-6-p-tolyl-s-tetrazine.

[1] Post-emergence activity index:
0=no effect.
1=slight injury to plants but no kill.
2=moderate injury to plants but no kill.
3=severe injury to plants but no kill.
4=0 to 50% plant kill.
4+=75 to 95% plant kill.
5-=95 to 100% plant kill.
5=complete kill.

EXAMPLE 7

To further illustrate the pre-emergence activity, 3-amino-6-phenyl-s-tetrazine, 3-amino-6-(m-chlorophenyl)-s-tetrazine, 3-amino-6-p-tolyl-s-tetrazine, 3-(m-chlorophenyl)-6-dimethylamino-s-tetrazine and 3-(p-chlorophenyl)-6-dimethylamino-s-tetrazine as illustrative compounds are each mixed with a 50% acetone/water solution containing 0.1% sodium dioctyl sulfosuccinate in sufficient quantities to produce concentrations equivalent to approximately 10 and 2 pounds per acre when applied to a variety of plant seeds in the manner described in Example 1(B) above. Plants treated with these compounds at the concentrations mentioned above appear in Column 1 of Table IV, below. The seeded containers are next examined at intervals. The data tabulated in Table IV is recorded four weeks after a solution of each of the compounds is applied to the seeded containers. This data clearly demonstrates the very pronounced pre-emergence activity exhibited by certain s-tetrazines.

*Table IV*

PRE-EMERGENCE ACTIVITY [1]

| Test Species | Compound (1) (Col. 1) | Compound (2) (Col. 2) | Compound (3) (Col. 3) | Compound (4) (Col. 4) | Compound (5) (Col. 5) |
|---|---|---|---|---|---|
| 10 lbs./A.: | | | | | |
| Cotton | 0 | 1 | 0 | 1 | 1 |
| Wild Oats | 4 | 4 | 5 | 4 | 4 |
| Snap Beans | 2 | 2 | 2 | 2 | 5 |
| Corn | 0 | 2 | 2 | 2 | 3 |
| Pigweed | 5 | 5 | 5 | 5 | 5 |
| Crabgrass | 5 | 5 | 5 | 5 | 5 |
| Mustard | 5 | 5 | 5 | 5 | 5 |
| Purslane | 5 | 5 | 5 | 5 | 5 |
| Millet | 5 | 5 | 5 | 5 | 5 |
| Ryegrass | 5 | 5 | 5 | 5 | 5 |
| 2 lbs./A.: | | | | | |
| Pigweed | 5 | 5 | 5 | 5 | 5 |
| Crabgrass | 4+ | 4+ | 4+ | 4+ | 4+ |
| Mustard | 5- | 5- | 5- | 5- | 5- |
| Purslane | 5 | 5 | 5 | 5 | 5 |
| Millet | 4 | 4 | 4 | 4 | 5 |
| Ryegrass | 1 | 0 | 1 | 1 | 1 |

[1] Pre-emergence activity index is as defined in Table III above.

Compound (1): 3-amino-6-phenyl-s-tetrazine.
Compound (2): 3-amino-6-(m-chlorophenyl)-s-tetrazine.
Compound (3): 3-amino-6-p-tolyl-s-tetrazine.
Compound (4): 3-(chlorophenyl)-6-dimethylamino-s-tetrazine.
Compound (5): 3-(p-chlorophenyl)-6-dimethylamino-s-tetrazine.

EXAMPLE 8

To illustrate the residual activity displayed by the compounds of the invention, 3-(p-chlorophenyl)-6-dimethylamino-s-tetrazine is added to 50% water/acetone solutions in sufficient quantities to produce compositions approximating 10 and 2 pounds per acre. These solutions are applied to flats of sterilized soil. One group of flats is seeded immediately after treatment and the other group is seeded one week following treatment. Eight weeks after seeding the flats are examined and the results recorded in Table V. Immediately following examination, these flats are reseeded to the variety of illustrative plants specified in footnote [a] at the bottom of Table V. Three weeks after replant, the flats are examined and the results shown in footnote [a] of said table are recorded.

*Table V*

RESIDUAL HERBITOXICITY [1]

| Test Species | 10 Pounds per Acre | | 2 Pounds per Acre | |
|---|---|---|---|---|
| | Seeded Instantly | Seeded after one week | Seeded Instantly | Seeded after one week |
| Corn | 5- | 3 | 2 | 0 |
| Soybeans | 5 | 5 | 2 | 0 |
| Tomato | 5 | 5 | 5 | 5 |
| Wheat | 5 | 5 | 5 | 5 |
| Pigweed | 5 | 5 | 5 | 5 |
| Mustard | 5 | 5 | 5 | 5 |
| Spinach | 5 | 5 | 5 | 5 |
| Crabgrass | 5 | 5 | 5 | 5 |
| Millet | 5 | 5 | 5 | 5 |
| Purslane | 5 | 5 | 5 | 5 |
| Fescue | 5 | 5 | 5 | 4 |
| Bluegrass, Kentucky | 5 | 5 | 5 | 5 |
| Bentgrass | 5 | 5 | 5 | 5 |

[1] Residual herbitoxicity index is as defined in Table III above.

[a] These flats are again seeded after 8 weeks and after treatment to corn, tomato, wheat, mustard, crabgrass, purslane, and pigweed. At the 10 lbs./A. rate, all test plants are killed. At the 2 lbs./A. rate, corn and tomatoes are not injured; wheat, mustard and crabgrass are stunted but not killed; and purslane and pigweed are killed.

We claim:
1. A method for the control of undesirable plant growth which comprises: applying to an area to be protected from such growth an unsymmetrically disubstituted s-tetrazine compound represented by the formula:

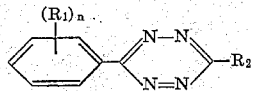

where $R_1$ is a radical selected from the class consisting of hydrogen, lower alkyl, halogen, hydroxy, lower alkoxy, lower alkylthio, carboxyl, (lower) carbalkoxy, amino, lower monoalkyl amino, and lower dialkyl amino; $n$ is an integer from 1 to 3, and $R_2$ is a substituent selected from the group consisting of hydrogen, halogen and

wherein $R_3$ and $R_4$ each represents a radical selected from the group consisting of hydrogen, lower alkyl, lower alkenyl, phenyl, hydroxy-substituted lower alkyl, carboxy-substituted lower alkyl, and when joined, $R_3$ and $R_4$ constitute a 3- to 6-membered heterocyclic moiety selected from the group consisting of aziridinyl, morpholino and piperidinyl, in an amount sufficient to produce herbicidal action.

2. A method for controlling undesirable plant growth according to claim 1, wherein the compound is 3-(p-chlorophenyl)-6-dimethylamino-s-tetrazine.

3. A method for controlling undesirable plant growth according to claim 1, wherein the compound is 3-dimethylamino-6-phenyl-s-tetrazine.

4. A method for controlling undesirable plant growth according to claim 1, wherein the compound is 3-(m-chlorophenyl)-6-dimethylamino-s-tetrazine.

5. A method for controlling undesirable plant growth according to claim 1, wherein the compound is 3-dimethylamino-6-p-tolyl-s-tetrazine.

6. A method for controlling undesirable plant growth according to claim 1, wherein the compound is 3-(p-chlorophenyl)-6-diethylamino-s-tetrazine.

References Cited in the file of this patent

Gragauskas et al.: J. Am. Chem. Soc., vol. 80, pages 3155 to 3159 (1958).